US012453978B2

(12) United States Patent
Isabell

(10) Patent No.: US 12,453,978 B2
(45) Date of Patent: Oct. 28, 2025

(54) SHOWER WAND SCRUBBER

(71) Applicant: James K. Isabell, Nome, AR (US)

(72) Inventor: James K. Isabell, Nome, AR (US)

( * ) Notice: Subject to any disclaimer, the term of this patent is extended or adjusted under 35 U.S.C. 154(b) by 280 days.

(21) Appl. No.: 18/122,787

(22) Filed: Mar. 17, 2023

(65) Prior Publication Data

US 2024/0307896 A1 Sep. 19, 2024

(51) Int. Cl.
*B05B 1/18* (2006.01)
*A46B 15/00* (2006.01)

(52) U.S. Cl.
CPC ............ *B05B 1/18* (2013.01); *A46B 15/0055* (2013.01); *A46B 2200/1006* (2013.01)

(58) Field of Classification Search
CPC .................. B05B 1/18; A46B 15/0055; A46B 2200/1006; A46B 11/063; A46B 7/042; A61H 7/003
USPC ....................................................... 4/605–606
See application file for complete search history.

(56) References Cited

U.S. PATENT DOCUMENTS 2,807,816 A * 10/1957 O'Brien .................. A47L 17/00 401/289
2,822,559 A * 2/1958 Manville .................. B25G 3/00 285/402
3,055,033 A * 9/1962 Kaye ........................ A46B 9/00 15/184
3,992,744 A * 11/1976 Fassler ................... A47K 7/046 451/356
4,509,221 A * 4/1985 Simpson, Jr. ............. B05B 3/04 15/97.1
4,685,682 A * 8/1987 Isabell ................... A63B 60/42 473/282
4,988,228 A * 1/1991 Yeh ...................... A46B 11/063 132/121
5,129,121 A * 7/1992 Gelman ................. A46B 13/06 15/29
5,316,401 A * 5/1994 Sears ...................... A47L 17/00 401/203
5,823,229 A * 10/1998 Bertrand .............. B01D 35/043 210/138
5,858,215 A * 1/1999 Burchard ................ C02F 1/003 137/551
5,906,319 A * 5/1999 Crowl .................. A46B 11/066 239/318
5,913,982 A * 6/1999 Phillips ..................... B08B 1/36 15/24
6,152,635 A * 11/2000 Wu ......................... A47L 13/12 401/27
7,237,277 B1 * 7/2007 Tsai ....................... A46B 7/023 4/615
8,066,204 B2 * 11/2011 Petrovic ................ B05B 1/1618 239/443

(Continued)

*Primary Examiner* — Lori L Baker

(74) *Attorney, Agent, or Firm* — Lyman Moulton, Esq.; Moulton Patents, PLLC

(57) ABSTRACT

The Shower Wand Scrubber includes an expandable length handle which securely attaches to the shower wand head that aids in cleaning hard-to-reach areas of the body. This product is designed to have different types of attachments such as exfoliating scrubbing clothes, loofas, sponges or a massager with ease allowing the water to flow from the shower wand head through the attached device. This eliminates the need for users to buy individual wands, scrubbers, or loofahs and allows users to better cleanse themselves.

16 Claims, 3 Drawing Sheets

(56) References Cited

U.S. PATENT DOCUMENTS

| | | | | |
|---|---|---|---|---|
| 8,191,196 | B2 * | 6/2012 | Aguilar | A47K 7/024 4/606 |
| 8,342,768 | B1 * | 1/2013 | Johnston | A46B 5/0095 401/289 |
| 8,347,425 | B2 * | 1/2013 | Bronstein | E03C 1/063 4/615 |
| 8,719,975 | B2 * | 5/2014 | Phillips | A47K 3/28 4/597 |
| 8,985,886 | B1 * | 3/2015 | Derrick | A46B 15/0055 4/606 |
| 11,419,461 | B1 * | 8/2022 | Papageorge | A47K 7/028 |
| 12,029,360 | B2 * | 7/2024 | Milcheck | A47K 7/028 |
| 2003/0126678 | A1 * | 7/2003 | Wright | A47K 7/046 4/606 |
| 2005/0242210 | A1 * | 11/2005 | Heren | B05B 15/652 239/525 |
| 2006/0058714 | A1 * | 3/2006 | Rhoades | A46B 5/0016 601/72 |
| 2006/0138253 | A1 * | 6/2006 | Petrovic | B05B 1/1609 239/443 |
| 2006/0208103 | A1 * | 9/2006 | DeBoer | E03C 1/0409 239/289 |
| 2007/0262175 | A1 * | 11/2007 | Fan | A46B 11/066 239/525 |
| 2008/0180255 | A1 * | 7/2008 | Isabell | G06K 19/07749 156/60 |
| 2009/0153334 | A1 * | 6/2009 | Burns | G06K 19/07798 340/572.8 |
| 2009/0304434 | A1 * | 12/2009 | Girvan | A47K 7/02 401/188 R |
| 2014/0330289 | A1 * | 11/2014 | Revivo | A46B 13/02 606/131 |
| 2015/0076254 | A1 * | 3/2015 | Farley | E03C 1/06 239/532 |
| 2016/0088927 | A1 * | 3/2016 | Knight | B25G 1/04 15/4 |
| 2017/0056898 | A1 * | 3/2017 | Streetmaker | B05B 1/185 |
| 2019/0110647 | A1 * | 4/2019 | Kolonne | A46B 5/005 |
| 2019/0150677 | A1 * | 5/2019 | Mc Donell | A46B 11/0062 |
| 2021/0298539 | A1 * | 9/2021 | Arkwright | A46B 17/02 |
| 2023/0389757 | A1 * | 12/2023 | Mason | A46B 15/0089 |
| 2024/0164595 | A1 * | 5/2024 | Milcheck | A47K 7/028 |
| 2024/0278264 | A1 * | 8/2024 | Fu | B05B 1/1663 |
| 2024/0384515 | A1 * | 11/2024 | Backus | E03C 1/0408 |

* cited by examiner

SHOWER WAND SCRUBBER

BACKGROUND

Showering on a daily basis often does not equate to a full body, completely clean, experience as some areas are a challenge to access when bathing. Although individuals may use a scrubber, or some other accessory, there's still a lot to be desired when it comes to ensuring every shower yields a full body cleansing. There have been no products available as original equipment or as an aftermarket to address this problem.

An apparatus to help you achieve a completely clean full body experience when showering, especially in those hard to reach areas, is not being met by any known device or system at present. There have been no products available as original equipment or as an aftermarket to address this problem either.

SUMMARY OF THE INVENTION

The main purpose of the shower wand scrubber is to provide users with a multi-functional extendable shower wand with an interchangeable head attachment to ensure individuals are able to bathe hard-to-reach areas of the body, with ease.

Figure 1:
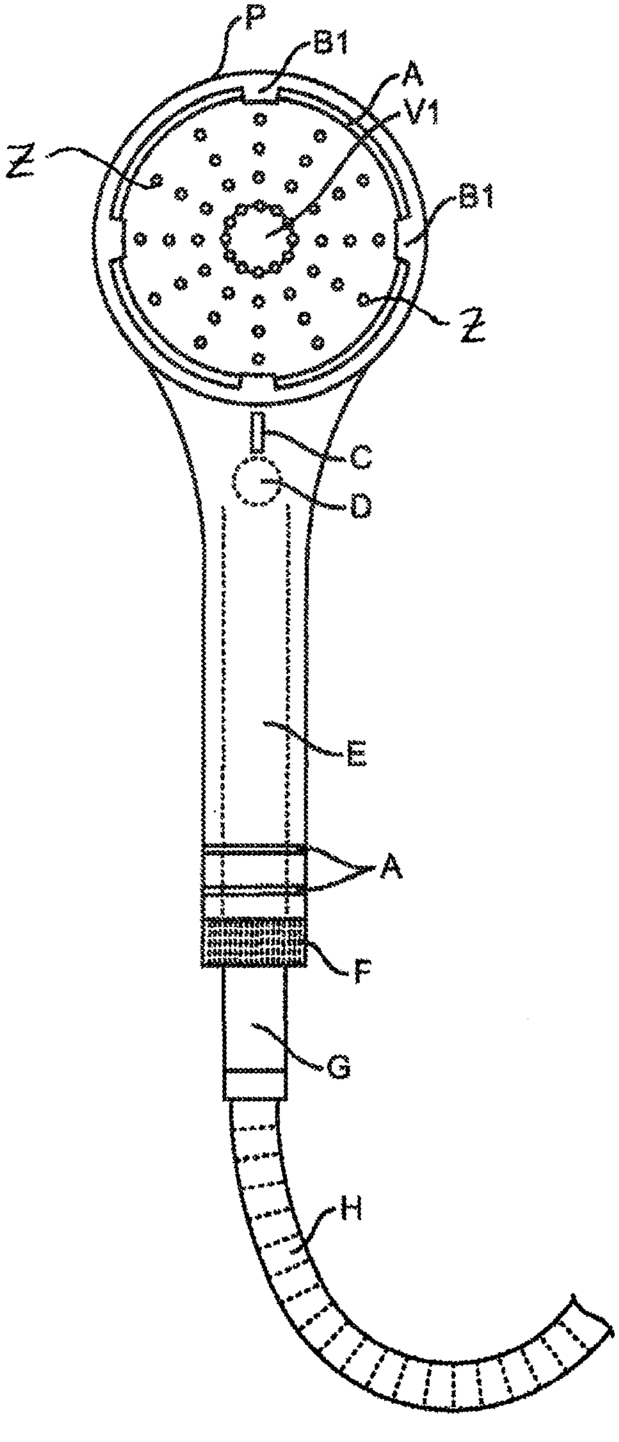
FIG. 1 is a front perspective view of the shower wand scrubber in accordance with an embodiment of the present disclosure.

Throughout the description, similar reference numbers may be used to identify similar elements depicted in multiple embodiments. Although specific embodiments of the invention have been described and illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

FIG. 1 is a front perspective view of the shower wand scrubber showing: shower wand P, O-ring referenced as A, lock tab referenced as B1, spray changer referenced as C, stop ball valve referenced as D, inner shaft referenced as E with a rubber grip in embodiments, half turn lock nut referenced as F, expandable handle referenced as G which expands by extending the inner shaft E, flexible hose referenced as H, in accordance with an embodiment of the present disclosure. The orifice V1 allows water to be concentrated in a single stream via the spray changer C from distributed many smaller holes Z to a concentrated single larger jet or single larger stream through the single center hole or orifice V1.

Figure 2:
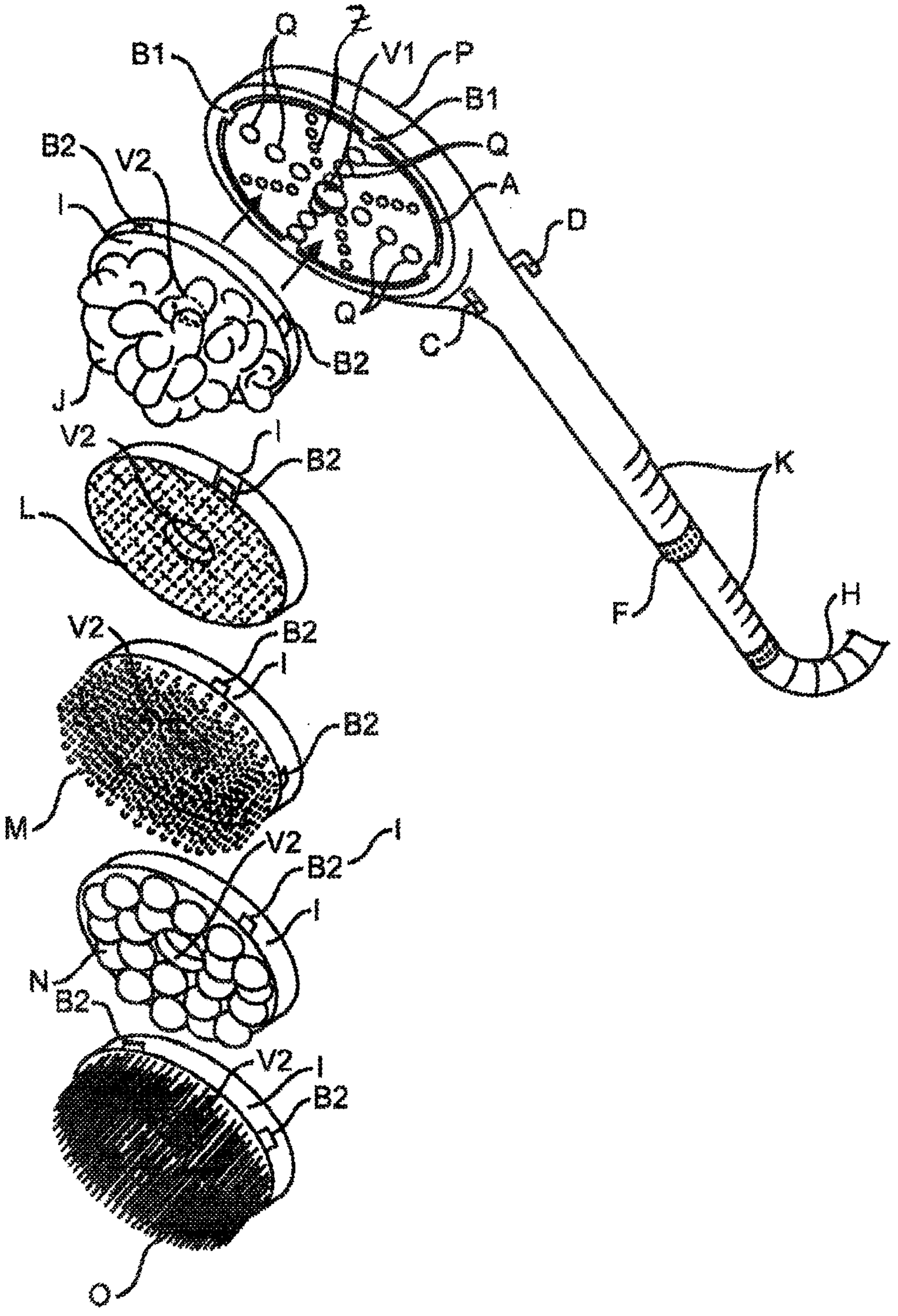
FIG. 2 is a left side perspective view of the shower wand scrubber in accordance with an embodiment of the present disclosure.

FIG. 2 is a left side perspective view of the shower wand scrubber showing: shower wand P, O-ring referenced as A, lock tab referenced as B1, spray changer referenced as C, stop ball valve referenced as D, half turn lock nut referenced as F, flexible hose referenced as H, interchangeable head referenced as I, puff loofah attachment referenced as J, expanded handle K expanded by the inner shaft E, exfoliating cloth scrubber with sponge referenced as L, rubber scrubs for pets referenced as M, massage attachment referenced as N, bristles attachment referenced as O, in accordance with an embodiment of the present disclosure. The orifice V1 in the shower head P allows water to be concentrated in a single stream via the spray changer C. Each of the attachments J, L, M, N and O comprise a center orifice V2 to pass a concentrated stream of water. Each of the attachments J, L, M, N and O also comprise lock notches B2 complementary to the lock tabs B1 on the shower head P. The shower head also comprises rubber nubs Q for further attachment of the various shower head attachments.

Figure 3:
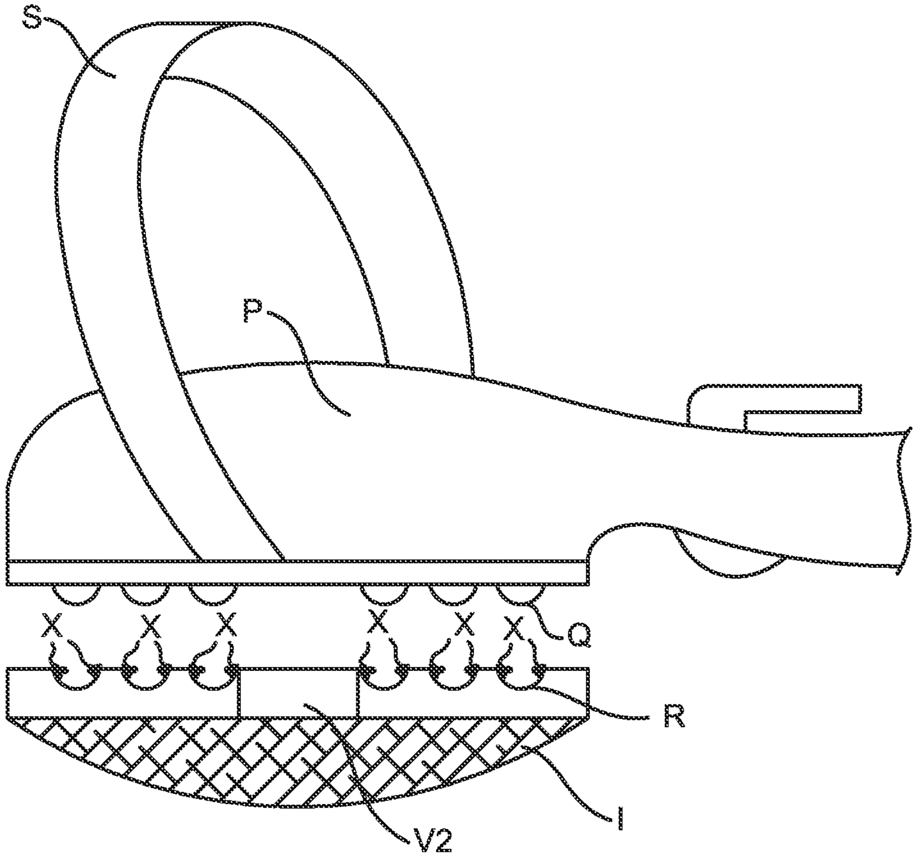
FIG. 3 is a bottom perspective view of the shower wand scrubber in accordance with an embodiment of the present disclosure.

FIG. 3 is a bottom perspective view of the shower wand scrubber showing: interchangeable head referenced as I, shower wand referenced as P, rubber nubs outlet or simply 'nubs' referenced as Q, interlocking indentation referenced as R with retaining ridges X also known herein as indentations, in accordance with an embodiment of the present disclosure. Also, an elastic strap S holds a user's hand against a back of the users hand and palm to the shower head to facilitate control of the shower head in scrubbing use.

The present disclosed shower wand scrubber, also known as "Shower Wand Scrubber", offers a modern alternative option that allows users to employ the shower wand head as a scrubber to thoroughly wash all areas of the body; thus, eliminating the need to buy limited secondary supplies, i.e., an independent wooden scrubber. Expanding on the initial design of an average shower head, the Shower Wand Scrubber introduces a novel shower head that conveniently attaches to the shower valve adapter, giving users more length to access areas of the body that are typically hard-to-reach such as the upper and lower back, legs, etc. which allows for a cleaner and more enjoyable shower experience. With the Shower Wand Scrubber, users will be able to interchangeably attach a wide variety of attachments that include an exfoliating cloth scrubber with a sponge, a massage attachment, a puff loofah attachment and a bristles attachment for the primary shower head. Moreover, the Shower Wand Scrubber can be used for pets and comes with rubber scrubbing attachments specifically designed for that purpose. After usage of an attachment, one can simply run the water to rinse off the piece and then twist it off to hang and, ultimately, dry.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

What is claimed is:

1. A shower wand comprising:

a shower head comprising a plurality of lock tabs and a hard o-ring attachment to a plurality of various shower head attachments; and a handle connected to the shower head and comprising an inner shaft configured to expand a length of the handle by a length of the inner shaft via a lock nut.

2. The shower wand of claim 1 wherein one of the plurality of various shower head attachments is a puff loofah attachment.

3. The shower wand of claim 1 wherein one of the plurality of various shower head attachments is a soft rubber bristles scrub for pets.

4. The shower wand of claim 1, wherein one of the plurality of various shower head attachments is a massage attachment comprising soft semispherical bumps.

5. The shower wand of claim 1, wherein one of the plurality of various shower head attachments is a sponge covered by an exfoliating cloth.

6. The shower wand of claim 1, wherein one of the plurality of various shower head attachments is a hard bristles scrub for cleaning a shower.

7. The shower wand of claim 1, wherein the handle comprises a rubber grip and the inner shaft comprises a rubber grip for expanding the handle.

8. The shower wand of claim 1, further comprising a plurality of rubber nubs on the shower head configured to be received into complementary indentations in the plurality of various shower head attachments.

9. The shower wand of claim 1, further comprising a spray changer to adjust a water flow from the shower head from multiple and smaller jets to a single larger jet.

10. The shower wand of claim 1, further comprising a stop ball valve proximal the shower head configured to stop a water flow from the handle to the shower head.

11. The shower wand of claim 1, further comprising an elastic strap configured to pressurize a grip on the shower wand for rigorous scrubbing.

12. The shower wand of claim 1, further comprising a rubber compound o-ring interface between the inner shaft and the handle.

13. The shower wand of claim 1, wherein each of the plurality of shower heads comprise a single jet configured for a concentrated water flow therefrom.

14. The shower wand of claim 1, wherein each of the plurality of shower head attachments comprise a plurality of lock notches complementary to the plurality of lock tabs in the shower head.

15. The shower wand of claim 1, wherein the hard o-ring of the shower head comprises nylon.

16. The shower wand of claim 1, wherein the hard o-ring of the shower head comprises metal.

* * * * *